United States Patent [19]
Ohtsuji et al.

[11] Patent Number: 5,295,573
[45] Date of Patent: Mar. 22, 1994

[54] FLEXIBLE SCREW AND TRANSPORT APPARATUS COMPRISING SAME

[75] Inventors: Masaaki Ohtsuji, Takarazuka; Naoki Ohmori, Amagasaki; Kenjiro Ishihara, Itami; Shigeo Mori; Isao Yokoyama, both of Yokohama; Kazushi Miyake, Ibaraki; Keiichi Maeda, Tokyo, all of Japan

[73] Assignee: Mitsubishi Cable Industries, Ltd., Amagasaki, Japan

[21] Appl. No.: 720,484

[22] PCT Filed: Jun. 16, 1991

[86] PCT No.: PCT/JP90/01379

§ 371 Date: Aug. 26, 1991

§ 102(e) Date: Aug. 26, 1991

[30] Foreign Application Priority Data

| Oct. 26, 1989 | [JP] | Japan | 1-277074 |
| Feb. 1, 1990 | [JP] | Japan | 2-22710 |
| Feb. 1, 1990 | [JP] | Japan | 2-27709 |
| Feb. 9, 1990 | [JP] | Japan | 2-30502 |
| Feb. 9, 1990 | [JP] | Japan | 2-30503 |
| Feb. 9, 1990 | [JP] | Japan | 2-30504 |
| Apr. 6, 1990 | [JP] | Japan | 2-90138 |
| Apr. 28, 1990 | [JP] | Japan | 2-113050 |
| Apr. 28, 1990 | [JP] | Japan | 2-113051 |
| Apr. 28, 1990 | [JP] | Japan | 2-113052 |
| Apr. 28, 1990 | [JP] | Japan | 2-113053 |
| Apr. 30, 1990 | [JP] | Japan | 2-112359 |
| Apr. 30, 1990 | [JP] | Japan | 2-112360 |
| Apr. 30, 1990 | [JP] | Japan | 2-112361 |
| Apr. 30, 1990 | [JP] | Japan | 2-112362 |
| Apr. 30, 1990 | [JP] | Japan | 2-112363 |
| Jul. 19, 1990 | [JP] | Japan | 2-191990 |
| Jul. 19, 1990 | [JP] | Japan | 2-191991 |
| Aug. 1, 1990 | [JP] | Japan | 2-205482 |
| Aug. 2, 1990 | [JP] | Japan | 2-205594 |
| Aug. 2, 1990 | [JP] | Japan | 2-205595 |

[51] Int. Cl.$^5$ ................................. B65G 33/26
[52] U.S. Cl. ........................... 198/659; 198/676; 198/690.1
[58] Field of Search ........... 198/659, 676, 677, 690.1, 198/722, 723, 836.1

[56] References Cited

U.S. PATENT DOCUMENTS

| 2,620,917 | 12/1952 | Dahlberg | 198/659 |
| 3,141,545 | 7/1964 | Holland, Jr. | 198/659 |
| 3,191,762 | 6/1965 | Brietzke | 198/659 |
| 3,360,108 | 12/1967 | Voss | 198/659 |
| 3,381,801 | 5/1968 | Rastoin | 198/659 |
| 3,578,150 | 5/1971 | Pirovano et al. | 198/659 |
| 3,707,224 | 12/1972 | Rastoin | 198/659 |
| 3,727,746 | 4/1973 | Slusher | 198/659 |

FOREIGN PATENT DOCUMENTS

0187889 7/1986 European Pat. Off.

(List continued on next page.)

*Primary Examiner*—James R. Bidwell
*Attorney, Agent, or Firm*—Wenderoth Lind & Ponack

[57] ABSTRACT

The flexible screw of the invention comprises a flexible rod and a cord helically set on the rod, and can be installed along straight and curved paths of transport. It ensures smooth transport of containers and provides container transport apparatus of simplified construction at reduced cost. Moreover, abrasion of pipe during transport of powder and granular material can be reduced. The container transport apparatus of the present invention is equipped with the screw mentioned above and a guide, or two screws, the members of each pair being positioned in parallel at a given distance, and transfers containers held by the screw and the guide, or the two screws by rotating the screw(s). The container transport apparatus of the present invention enables smooth transport of containers even through a curved path, reduces maintenance cost of the screw(s) during operation, and inhibits abrasion of the rail to a considerable degree. Further, the powder and granular material transport apparatus of the present invention reduces abrasion of pipe.

17 Claims, 10 Drawing Sheets

FOREIGN PATENT DOCUMENTS

| | | |
|---|---|---|
| 1054013 | 3/1959 | Fed. Rep. of Germany ... 198/690.1 |
| 3006101 | 8/1981 | Fed. Rep. of Germany ...... 198/676 |
| 8701229 | 7/1987 | Fed. Rep. of Germany . |
| 1434521 | 2/1966 | France . |
| 42-18782 | 9/1967 | Japan . |
| 50-102841 | 8/1975 | Japan . |
| 54-17266 | 2/1979 | Japan . |
| 54-34978 | 3/1979 | Japan . |
| 56-132218 | 10/1981 | Japan . |
| 56-132220 | 10/1981 | Japan . |
| 57-188713 | 11/1982 | Japan . |
| 59-62430 | 4/1984 | Japan . |
| 60-187113 | 12/1985 | Japan . |
| 0051411 | 3/1986 | Japan ................................ 198/659 |
| 2103171 | 2/1983 | United Kingdom . | ically, permanent magnets are embedded in the

FLEXIBLE SCREW AND TRANSPORT APPARATUS COMPRISING SAME

TECHNICAL FIELD

The present invention relates to flexible screws suitable for transporting various columnar or cylindrical containers, such as glass, plastics or aluminum bottles or cans, filled with liquids, solids or the like (these containers will be hereinafter referred to collectively as "containers"), or for transporting powder and granular materials which are so-called bulk materials, and also to apparatus comprising the screw for transporting such containers or powder and granular materials.

BACKGROUND ART

To give containers of the above-mentioned type and having increased capacities, vertically elongated and lightweight containers (e.g., polyethylene terephthalate (PET) bottles) have found wide use in recent years, so that when transported on belt conveyors or roller conveyors which are usually used, these containers are liable to tumble and transport is difficult. Conveyors further have the problems, for example, of necessitating accurate positioning, occupying a large space as fixed equipment and requiring a high equipment cost.

Container transport apparatus are therefore already in use which comprise two screws made of resin or the like and arranged in parallel at a specified distance from each other and which are adapted to transport containers by rotating the screws, with the neck of each container held between the screws (usually with a flange at the neck of the container in engagement with the screws to hold the container therebetween in suspension).

The apparatus transports containers by a principle entirely different from that of conventional conveyors, i.e., by the frictional contact of the screws with the neck of the container, and permits accurate container position, facilitated automation of production lines, its simple and compact construction and low equipment cost.

Generally, the screws for use in the apparatus comprise a rigid rod prepared from resin or the like by solidification and are formed with a helical continuous groove. However, due to their rigidness, such screws cannot be employed for curved paths of transport although they are usable for straight transport paths. Accordingly, the curved transport path requires another transport device, which renders the overall container transport apparatus complex in construction and more costly as equipment and is likely to impede smooth transport.

On the other hand, coiled wires are available which are similar in construction to the screws described above. Wires of this type are conventionally used for transporting powder and granular materials, and many of them are made of a metal such as steel. Apparatus for transporting powder and granular materials comprise such a coiled wire inserted in and extending through a metal or resin pipe, and are so adapted that the powder and granular materials placed into an inlet formed in one end of the pipe are transported to an outlet formed in the other end thereof by rotating the wire.

However, since the wire is made of a metal material, the pipe undergoes marked abrasion. Especially when the apparatus is initiated into operation, the wire is very likely to come into contact with the pipe inner wall, which in turn is ground by the wire and easily wears away. It is therefore important to avoid the abrasion of the pipe inner wall to the greatest possible extent to reduce the cost of maintenance.

Accordingly, an object of the present invention is to provide a screw most suited for use in apparatus for transporting powder and granular materials as well as in container transport apparatus to thereby overcome the foregoing problems.

Another object of the present invention is to provide a novel apparatus for transporting containers or powder and granular materials with use of the screw fulfilling the above object.

DISCLOSURE OF THE INVENTION

The screw accomplishing the former object is characterized in that the screw comprises a flexible rod, and a cord-shaped element helically set on the rod. By cord-shaped element is meant an element having a shape like that of a cord, but not composed of threads twisted or woven together and instead formed of resin. Hereinafter this element will be referred to simply as a cord. Preferably, at least the surface layer of the cord is formed of a resin. The container transport apparatus fulfilling the latter object is characterized in that the apparatus comprises two such screws, or a screw and a guide, with the members of each pair arranged in parallel at a specified distance from each other, and that containers held between two screws or a screw and a guide are transported by the rotation of the screw(s). Further, the powder and granular material transport apparatus is characterized in that the above screw is inserted through a pipe and is rotated to transport a powder and granular material through the pipe.

The screw of the present invention has flexibility and can therefore be installed not only along a straight transport path but also along a curved transport path without difficulty. Accordingly, the screw not only assures smooth transport of containers but also simplifies the overall construction of the transport apparatus and reduces equipment cost. Further, when used for transporting powder and granular materials, the screw serves to avoid the abrasion of the pipe inner wall.

While the screw of the present invention basically comprises a flexible rod and a cord set helically on the rod, it is important that the screw have characteristics required for transporting containers and powder and granular materials, i.e., rigidity permitting the screw to rotate without deflection and sufficient for the screw to satisfactorily transmit the rotational torque delivered to one end thereof to the other end, and flexibility permitting the screw to be installed easily along curved paths of transport. According to the invention, consideration must be given to the following in selecting the material for the rod which has both the characteristics of flexibility and rigidity. That is, in the case of container transport apparatus such as the one shown in FIGS. 10 to 12 in which the screw is used, the screw is rotated in engagement with a rail (generally L-shaped and having a body portion and a shelf portion projecting from the body portion at a right angle therewith), whereas if this arrangement is used as it is, the screw is likely to derail, so that the rail is usually provided with means for attracting the screw thereto.

The attracting means is not limited specifically insofar as the screw can be thereby held attracted to the body portion and shelf portion of the rail free of derailment. For example, when the screw is to be attracted magnetically, permanent magnets are embedded in the body portion at a specified spacing as is the case with some of the embodiments given later, or the rail is prepared from a mixture of resin material (e.g., nylon) and magnetic material. Alternatively, when negative pressure is to be utilized, the body portion is formed, for example, with a bore extending therethrough and with small holes in the shelf projecting side thereof at a predetermined spacing in communication with the bore, so that the interior of the bore is evacuated by a vacuum pump to attract the screw through the small holes. Accordingly, for example when the magnetism of magnets or the like is utilized as the attracting means, it is desired that the rod be made of a material which is magnetically attractable. Such materials for the rod are organic or inorganic resins or metal ropes.

When the rod is to be entirely formed of a resin in the case where magnetism is utilized as the attracting means, a magnetic resin is incorporated into the resin. Typical examples of such magnetic resins which are satisfactory to use insofar as they are magnetic, include resins containing a magnetism-imparting component. The magnetism imparting component is not specifically limited provided that it is capable of giving magnetism to the resin. Examples of useful components are ferrite, iron powder, nickel powder, magnetic stainless steel powder, magnetic powders of rare-earth elements, etc. The component is used in an amount sufficient for the magnetic action between the screw and the rail to hold the screw to the rail. For example, about 10 to about 50 parts by weight, preferably about 15 to about 30 parts by weight of the magnetism-imparting component is used per 100 parts by weight of the resin.

The rod, which may be made entirely of resin, may alternatively comprise a resin layer covered with a knitted structure of metal wires, metal wires extending therethrough, or a metal wire core therein to give satisfactory flexibility to the rod. However, the rod is preferably in the form of a metal rope to exhibit higher flexibility and rigidity. Since magnets are usually used as the attracting means, examples of useful metal ropes are those made of magnetic metals including iron steel, nickel, cobalt, and alloys of such metals. The metal rope itself has basically the same construction as known steel wires and comprises a strand of several (or tens of) wires laid together, and several strands laid around the strand. Preferably, the rope comprises several layers of closely coiled wires, each layer having multiwire windings each including several wires, with the winding direction reversed from layer to layer. The lay of the rope may be ordinary lay or lang lay, and the strands may be laid in either direction, i.e., to the left or to the right, without any particular limitation.

In the case where the rod is such a metal rope, the cord may be helically wound directly on the metal rope, whereas it is desirable to provide a coating layer on the metal rope to obviate the likelihood that the cord will be abraded by the rope especially in curved transport paths owing to repeated transport of containers and also to prevent evaporation of a lubricant usually contained in the metal rope for diminishing the friction between the wires, permitting the rope to retain the lubricant more effectively.

With an increase in the thickness of the coating layer, it is more likely that the satisfactory flexibility originally possessed by the metal rope will be impaired, and so the coating layer to be formed on the rod of specified diameter is preferably as thin as possible. For example, when the metal rope has a diameter of 6.0 mm for use in transporting containers, the thickness of the coating layer is usually 0.1 to 2.0 mm, preferably 0.2 to 0.6 mm. It is also desired that the thickness of the coating layer be uniform to the greatest possible extent to give improved concentricity to the screw. Stated more specifically assuming that the thickness of the coating layer is t, it is desired that the value of $[t(max)-t(min)]/t$ be up to 0.1, more preferably up to 0.05. When meeting this numerical requirement, the screw is rotatable at a higher speed. The coating layer may be formed by the extrusion coating technique generally employed for resin materials. For example, in the case of extrusion coating, the metal rope is coated with a resin material by feeding the rope in a direction under a given tension and extruding the material in a molten state onto the rope from a die disposed coaxially therewith simultaneously with the advance of the rope, as in the case where electric cables are coated with an insulation.

When the coating layer is formed on the metal rope, it is important that the coating layer and the metal rope rotate as one body in view of torque transmission, since the screw is rotated in its entirety by a rotational torque which is usually delivered to one end of the screw for transporting containers or powder and granular materials. For this purpose, it is desirable to use such a structure that the coating layer is in contact with the metal rope over a large area so as not to slide on the metal rope. For example, it is useful to form a suitable number of projections on the metal rope, to wind a wire helically on the rope, or to provide flanges on the rope.

Although the cord to be helically wound around the rod may be made of a metal or resin, it is suitable that at least the surface layer of the cord be formed of a resin for the following reason. In the container transport apparatus, the screw is rotated usually as held attracted to a rail (generally an L-shaped rail having a body portion and a shelf portion projecting from the body portion at a right angle therewith). During the rotation of the screw, the cord is in sliding contact with the holding surfaces of the body portion and the shelf portion, and great contact friction occurs especially between the cord and the shelf portion which is subjected to the weight of containers being transported and to the gravity on the screw, producing marked wear on the cord and the shelf portion. Furthermore, the neck of the container moves along in sliding contact with the helical surface of the rod exposed between the turns of cord by being pushed forward by the rotation of the screw. Since the containers are transported in this mode, it is important to the product and safety that the neck of the container (including its flange) to be brought into contact with the screw be free of abrasion or damage. Especially great care should be given to the containers to be filled with a carbonated beverage to avoid flaws in the container. It is therefore more advantageous to use resin than metal for the surface layer of the cord because the damage to the cord and the rail can then be diminished to the greatest possible extent to reduce the maintenance cost and render the container neck flawless and also because the screw inserted in a pipe for use in the powder and granular material transport apparatus is very likely to contact the pipe inner wall especially on start-up.

When the screw is used for transporting powder and granular materials, the resin material for the cord may have a magnetic material incorporated therein as is the case with the rod. When the screw is used for transporting containers, however, it is desirable to use no magnetic material since magnets are generally used as the attracting means in the rail. In this case, the cord, if magnetic, will produce an electromotive force by cutting the magnetic flux with the rotation of the screw, resulting in a loss of rotational energy or hindrance of the smooth rotation of the screw. More preferably, the cord has a core in the form of a bundle of fibers. The presence of the core is advantageous in inhibiting the elongation of the cord due, for example, to a rise in temperature resulting from frictional heat or to a tensile load, consequently preventing the disturbance of the pitch of helical turns of the cord. Preferably, however, the core is up to 3.0% in specific amount of buckling. When the specific amount of buckling is greater than 3.0% and if the core is subjected to tension, the cord is easily stretched due to the crimp caused by buckling.

Incidentally, the specific amount of buckling is determined for a cord having an initial length $L_o$ and comprising a core coated with resin, by removing the resin layer from the core and measuring the length L of the core as tensed by a force 1/1000 of the tensile strength of the core, and is expressed in terms of the ratio of the difference between the length L and the initial length $L_o$ to the initial length $L_o$. Thus, the specific amount of buckling $\epsilon$ is given by the equation:

$$\epsilon = \frac{L - L_o}{L_o} \times 100(\%)$$

The material for the bundle of fibers serving as the core is not limited specifically insofar as the core acts as a tension member for the cord. Examples of useful fibers are natural fibers (vegetable fibers such as cotton, flax, hemp and coconut fibers, and animal fibers such as wool and silk), semisynthetic fibers (such as acetates), synthetic fibers such as polyamide fibers (e.g. nylon 6), polyester fibers (e.g. Kevlar and Tetoron), polyacrylonitrile fibers (e.g. acrylic fibers and modacylic fibers), polyvinyl alcohol fibers, polyvinyl chloride fibers, polyvinylidene chloride fibers, polyolefin fibers (e.g. polyethylene and polypropylene) and polyurethane fibers, inorganic fibers (such as glass fiber, graphite fiber, boron fiber and various metal fibers), etc. Among these, Kevlar is preferred in view of high strength, fatigue resistance, heat resistance, low creep property, etc. The core to be used is usually one composed of a multiplicity of fibers which are twisted together. The thickness of the bundle of fibers, which is dependent on the material of the core and the outside diameter of the cord, is 1,000 to 15,000 denier, preferably 1,500 to 9,000 denier. The number of fibers to be twisted into the bundle is 666 to 10,000, preferably 1,000 to 6,000.

According to the present invention, the cord is mounted helically around the flexible rod by a method which is not limited specifically, for example, by integrally molding the cord and the rod, or separately preparing the cord and the rod and winding the cord around the rod with or without the subsequent step of joining them together as will be described later. In view of various applications of the screw, however, it is favorable to wind the cord helically around the rod. When the screw is for use in transporting containers in this case, the pitch of windings of the cord on the flexible rod is determined in accordance with the speed of transport of containers, the size of the container, the quantity of containers to be transported, speed of rotation of the screw, etc., whereas when the screw is used for transporting powder and granular materials, the pitch can be determined relatively freely. The pitch of the cord need not be definite over the entire length of the rod but may be altered, for example, over a desired portion of the rod. To wind the cord around the rod having a resin surface layer without disturbing the pitch of the cord, it is favorable to wind the cord as partly implanted in the resin surface layer.

The organic or inorganic resin to be used for forming the rod in its entirety or the coating layer on the metal rope, and the cord is not limited specifically. Examples of useful organic or inorganic resins are polyolefins and copolymers thereof [such as polyethylene, polypropylene, ethylene-vinyl acetate copolymer (EVA), ethylene-ethyl acrylate copolymer (EEA) and like polyalkylenes and copolymers thereof, examples of preferred polyethylenes being ultrahigh-molecular weight-polyethylene (UHMWPE, usually at least 1,000,000, preferably at least 1,650,000, in molecular weight), low-molecular-weight polyethylene, high-molecular-weight polyethylene, etc.], polyethers (such as polyacetal, polyphenylene ether and the like), polyamides (such as nylon 6, nylon 6,6, nylon 11 and the like), fluorocarbon resins (such as polytetrafluoroethylene (PTFE), tetrafluoroethylene-perfluoroalkyl vinyl ether copolymer and the like), polyesters (such as polyethylene terephthalate and polybutylene terephthalate), etc. Examples of modified ultrahigh-molecular-weight polyethylenes are those disclosed in Japanese Patent Unexamined Publication Nos. 63-10647 and 63-12606. More specifically, such polyethylenes include, for example, one comprising an ultrahigh-molecular-weight polyethylene (a) having an intrinsic viscosity of at least 12 dl/g as measured in a decalin solution at 135° C., and a low- or high-molecular-weight polyethylene (b) having an intrinsic viscosity ($\eta$) c of 0.1 to 5 dl/g as measured in a decalin solution at 135° C., (1) the proportion of (a) being 20 to 95 wt. % based on (a)+(b), (2) the exemplary polyethylene having an intrinsic viscosity ($\eta$) c of 10 to 50 dl/g as measured in a decalin solution at 135° C. A preferred example of such a modified ultrahigh-molecular-weight polyethylene commercially available is Lubmer, product of Mitsui Petrochemical Industries, Ltd. (Lubmer L5000, Lubmer L4000 and Lubmer L3000).

It is especially desirable to give consideration to the abrasion resistance of the surface of the rod and the surface of the cord since the necks of containers or powder and granular materials are brought into contact with these surfaces. High abrasion resistance can be obtained when the specific wear rate concerned is up to $5 \times 10^{-4}$ mm$^3$/kg·m, preferably up to $5 \times 10^{-5}$ mm$^3$/kg·m. The specific wear rate is a value obtained by subjecting the material to a sliding test in contact with stainless steel (SUS304) under surface pressure of 3 kg/cm$^2$ at a sliding velocity (peripheral speed) of 33.3 m/min for 168 hours. Further to give improved durability to the screw, the resin to be used for the rod (especially the resin for forming the coating layer on the metal rope) must be up to 1.0, preferably up to 0.5, in coefficient of dynamic friction, and the resin usable for the cord needs to be up to 0.4, preferably up to 0.2, in this coefficient. The term "coefficient of dynamic friction" as used herein refers primarily to the coefficient of sliding friction of the resin on steel having surface roughness (Rz) of 6 μm, and is a value determined under surface pressure of 7.5 kg/cm$^2$ at a sliding velocity of 12 m/min.

Among the resins exemplified above, those fulfilling the specified requirements as to the specific wear rate and coefficient of dynamic friction include polyethylenes (especially UHMWPE resins, among which Lubmer is more preferable), polyethers (especially polyacetal) and polyamides (especially nylon 6). Among these, Lubmer is especially suitable in respect of resistance to sliding, durability, etc. Lubmer is an ultrahigh-molecular-weight polyethylene which is extrudable and excellent in self-lubricity (0.15 in coefficient of dynamic friction), abrasion resistance (up to $2 \times 10^{-5}$ mm$^3$/kg·m in specific wear rate) and critical PV value [to be described later, at least 300 (kg/cm$^2$)·(m/min)] as an outstanding slidable material. Moreover, the resin has high resistance to chemicals and is comparable to engineering plastics in mechanical strength (440 to 530 kg/cm$^2$ in tensile strength at break, 16,500 to 18,400 kg/cm$^2$ in flexural modulus).

The resin material fulfilling the requirements as to the specified wear rate and coefficient of dynamic friction described above may include therein an abrasion resistance-improving agent while meeting these requirements, in order to impart further enhanced durability to the screw. Typical of such improving agents are, for example, carbon black (especially superfine carbon black), polytetrafluoroethylene, whisker of potassium titanate or the like, brass powder, etc. The agent is used usually in an amount of about 5 to about 30 parts by weight per 100 parts by weight of the resin. The abrasion resistance-improving agent is preferably in the form of fine particles especially from the viewpoint of preventing damage to the neck of containers.

The screw of the present invention as used in the container transport apparatus advances containers by pushing the necks thereof by the rotation of the helical cord, while with the powder and granular material transport apparatus, the material is transported by the rotation of the helical cord. During the operation of the screw, therefore, the helical cord is always subjected to a force acting to alter the winding pitch of the cord. If the pitch is altered by this force, it becomes no longer possible for the apparatus to transport containers smoothly or to transport the powder and granular material at a constant rate. Thus, it is desired to avoid the alteration of the pitch to obviate such an objection.

With the apparatus for transporting containers or powder and granular materials, the path of transport is not always straight; rather, the apparatus is installed along curved paths of transport. In the case of curved paths, the smaller the radius of curvature thereof, the greater the flexibility required of the screw so that the screw can be laid readily along the path.

In the case where the resin surface layer is formed over the metal rope or the rod is made entirely of resin, it is suitable to form a helical groove in the resin surface layer of the rod for fixing the cord therein so as to give satisfactory flexibility to the screw in its entirety with diminished disturbance of the pitch of the cord. The cord wound as fitted in the helical groove is less likely to be disturbed in the pitch during the transport of containers or powder and granular material than when the cord is merely wound around the rod. The cord can be helically wound on the flexible rod having the resin surface layer, for example, by forming a cord-fixing helical continuous groove on the rod while the rod is being advanced toward a direction and being rotated at the same time, and fitting the cord into the continuous groove simultaneously with the formation of the groove. Alternatively, the cord can be helically wound on the flexible rod having the resin surface layer by forming a helical continuous groove on the rod while advancing the rod in a direction, revolving the cord about the direction of advance of the rod as the axis of revolution to move the cord around the rod and fitting the cord into the continuous groove at the same time while the groove is being formed.

Instead of the cord-fixing helical groove, the portions of the cord and the rod in contact with each other may be adhered or fused at spots or over the entire length. The method of adhesion or fusion is not limited specifically. Since both the rod and the cord have a surface resin layer, adhesion or fusion target is resin portions and thus, can be accomplished by known resin joining techniques. More specifically, the cord is adhered to the rod, for example, by applying an adhesive or double-faced tape to the contact portions thereof. The cord is fused to the rod, for example, by welding or uniting by heating. In the case where the screw is installed along a curved path, the operation of the screw is prone to produce a stress in the curved portion of the screw. It is therefore desired to provide an increased number of joints at the curved portion of the screw when spot joining is resorted to.

When at least the surface layer of the rod and the entire cord are made of resin, both may be molded integrally to reliably preclude the disturbance of pitch of the cord. Alternatively, the assembly of the rod and the cord may be covered thereon with a baked layer of coating composition comprising a polymer, or with a resin layer formed by a heat-shrinkable tube. When the assembly of rod and cord is covered, the rod and the cord are held together, and the resulting assembly is equivalent to the integral molding of the two members. The coating polymer composition to be used for the baked layer is preferably resistant to abrasion and low in frictional property in view of the sliding contact between the screw and the necks of containers or the powder and granular material as already stated. Examples of such compositions are formal varnish, polyester varnish, polyimide varnish, polyamide varnish, polyurethane varnish, silicone varnish, fluorocarbon resin varnish, etc. The coating composition is applied to the screw by a suitable method as by dipping or spraying, and the coating is treated also by a suitable method of baking. Thus, known techniques are usable therefor.

Although tubes of usual polymers, such as polyvinyl chloride, polyethylene, crosslinked polyethylene, polyamide and polyester, are usable as heat-shrinkable tubes, preferable to use are those made of engineering plastics or super-engineering plastics having high heat resistance, such as polysulfone, polyphenylene oxide, polyphenylene ether, polyethersulfone and the like. More preferable to use are tubes made of a resin which is at least about 500 kgf/cm$^2$ in tensile strength and at least about 100° C., preferably at least about 130° C., in thermal deformation temperature and which has high mechanical strength, heat resistance and abrasion resistance. The heat-shrinkable tube can be formed, for example, by extruding a thermoplastic resin into a tube, with a treatment conducted for radially stretching the tube as by blowing a gas into the tube to give an increased diameter. The screw is entirely enclosed with the tube thus prepared, and the tube is thereafter shrunk by heating and held to the screw in tight contact therewith.

The thickness of the layer to be formed by the coating polymer composition or the heat-shrinkable tube is determined suitably in accordance with the strength and flexibility required of the screw and is generally about 0.1 to about 3 mm.

When the screw of the present invention is used particularly for transporting containers, the necks of containers come into sliding contact also with the rod, so that it is more preferable to impart high abrasion resistance also to the contact portion of the rod. This can be accomplished easily and effectively, for example, by winding an abrasion-resistant tape on the rod, or by helically winding a metal wire around the rod in the helical gap formed between the helical windings of the cord. It is more desirable to wind the abrasion-resistant tape with a helical gap formed between the windings thereof and wind the cord as fitted in the gap than to merely wind the tape around the rod. The disturbance of the cord pitch can then be precluded because the cord is held in the gap. When the rod is a metal rope, the tape may be wound directly on the metal rope or on the coating layer formed on the rope. Preferably, the abrasion-resistant tape is up to $5 \times 10^{-5}$ mm$^3$/kg·m, more preferably up to $1.0 \times 10^{-5}$ mm$^3$/kg·m, in specific wear rate. Tapes meeting this standard as to abrasion are usable regardless of whether they are made of resin or metal. Examples of useful tapes are UHMWPE tape, tapes of fluorocarbon resins (such as PTFE, tetrafluoroethylenehexafluoro-propylene copolymer (FEP) and tetrafluoroethyleneperfluoroalkyl vinyl ether copolymer (PFA)), etc. Among these, UHMWPE tape is advantageous because of prolonged life against abrasion. Incidentally, this tape is about $2 \times 10^{-6}$ mm$^3$/kg·m in specific wear rate. Examples of useful metal tapes are stainless steel tape, aluminum alloy tape, brass tape and the like. Among these, stainless steel tape is great in elastic range, and highly resistant to corrosion, and therefore especially advantageous. The specific wear rate of this tape due to contact with plastics or rubber is so small as to be substantially negligible.

When the screw is sized specifically for use in the container transport apparatus, the thickness of the abrasion-resistant tape is 0.3 to 1.0 mm, preferably 0.4 to 0.7 mm in the case where it is made of resin, and 0.02 to 0.3 mm, preferably 0.05 to 0.1 mm in the case where it is a metal tape. In either case, the tape is 3 to 20 mm, preferably 5 to 10 mm, in width.

Only one or at least two metal wires may be wound on the rod in the helical gap. Thus, the number of metal wires is not limited. However, the number is preferably about two to about ten although dependent on the diameter of metal wires and the size of the screw. When a single metal wire is to be wound, it is important to position the wire approximately in the center of the helical gap formed between the helical windings of the cord, i.e., in the center of the portion to be in sliding contact with the neck of the container. Two or more wires, when used, are closely wound with the windings arranged in parallel in contact with one another, or are wound with a gap, i.e., with the windings spaced apart by a given distance. For close winding or gap winding, care should be taken so that as shown in FIG. 8, the midpoint of the winding width L of the metal wires is positioned approximately at the center of the sliding contact portion. When at least two metal wires are wound with a gap as shown in FIG. 8 (wherein three metal wires are used), the distance I between the metal wires, which is dependent on the size of the screw, is up to 6 mm, preferably 1 to 5 mm, more preferably about 3 mm. Preferably, the winding pitch P' of each metal wire shown in FIG. 8 is the same as the winding pitch P of the cord.

As will be apparent also from FIG. 8, the metal wire is smaller than the cord in size and is usually 0.1 to 1.5 mm, preferably 0.2 to 0.8 mm, in diameter. The material for the metal wire, although not limited specifically, is preferably highly resilient since the wire is thin and wound helically. Further, the wire material is preferably nonmagnetic when the screw is used in the container transport apparatus wherein magnets are used as the attracting means in the rail as already described, in order to prevent the loss of rotational energy of the screw due to a magnetically induced electromotive force and to ensure smooth rotation of the screw. Examples of metals having such properties are stainless steel, aluminum alloys, brass and the like.

Next, the apparatus of the present invention will be described, wherein the flexible screw is used for transporting containers or powder and granular materials. First, the apparatus of the invention for transporting containers comprises the screw and a guide, or two such screws which are arranged in parallel at a specified distance from each other for holding containers therebetween, so that the containers may be transported by rotating the screw(s). With the rotation of the screw, each container is pushed forward by the helically wound cord and transported along a path formed by the screw and the guide or by the two screws. The container can be transported by rotating the single screw disposed as opposed to the guide (hereinafter refferred to as "one-side drive"), or by rotating the two screws arranged as opposed to each other (hereinafer referred to as "two-side drive"). One-side drive is not only lower in maintenance cost but also more adjustable to various control operations for container transport than two-side drive, since the member to be arranged in parallel to the screw is the guide for merely guiding and holding the container. For example, it is possible to make a portion of the guide serve as a shiftable portion operable in connection with a sensor for detecting reject containers, such that the shiftable portion is moved in response to a detection signal from the sensor to remove reject containers from the transport path during transport.

The guide to be opposed to the screw for one-side drive is not limited specifically insofar as it is adapted to guide the necks of containers without causing difficulty in transporting containers. The guide may have the same construction as the rail for holding the screw in engagement therewith, or may be in the form of a round bar resembling the screw. In view of the production cost, however, the guide is preferably of simple construction. For example, the guide may be a round bar of resin having or not having a steel core extending centrally therethrough. Further, like the screw-side arrangement, the resin round bar may be fixedly mounted on a rail, or the guide to be installed may be the assembly of a round bar and a rail. When the round bar is prepared with a resin material and a magnetic material, the round bar may be alternatively held attracted to a rail by attracting means (e.g., magnets) carried in the rail in the same manner as in the screw-side arrangement to gently rotate the round bar and hold the neck of containers in uniform contact with the round bar.

Since transport apparatus incorporating such a screw are generally adapted to handle containers which are shaped like PET bottles, it is convenient to hold the container by nipping the trunk or neck of the container. Of course, it is important that the transport path have a width sufficient to nip the trunk or to nip the neck when the container is to be so held. When the neck is to be nipped, the flange at the neck is usually engaged with the screw and the guide or with the two screws to hold the container therebetween in suspension. When the trunk is to be nipped, it is desirable to use a conveyor as the main transport means since the transport force afforded only by the rotation of the screw(s) is low in the case where the screw and the guide or the two screws are used. The conveyor may be a common one and is disposed below the transport path for transporting containers as placed thereon. While the screw and the guide or the two screws act to prevent the container to be transported from tumbling by supporting its trunk at opposite sides, it is desirable to rotate the screw(s) during transport to give an auxiliary propelling force to the container. Further, since tall containers such as PET bottles are liable to fall, the trunk may be supported at its opposite sides additionally by two other screws, a screw and a guide, or two guides. As another mode of transport, both the neck and the trunk may be held at the same time. In this case, the container is held at least at the four portions, and the screw may be set at least at one of the four portions to give a force of transport. The combination of screw(s) and guide(s) is not limited. When the neck and the trunk are held, it is possible to position the container bottom up or to rotate the container through a desired angle by suitably determining the transport path.

With the container transport apparatus of the present invention, the screw is rotated usually as held in engagement with the rail as already stated, so that the rod and the cord of the screw are brought into sliding contact with the container, with the cord in sliding contact with the rail. Since the rail will wear and has to be replaced some time in the future although less susceptible to abrasion than the screw, it is also important to suitably select the combination of materials for the cord and the rail to give a longer life to both the screw and the rail. Since it is desirable to use resin at least for the surface layer of the cord of the screw according to the invention as already stated, the rail for use in the container transport apparatus of the invention is optimally made of metal. When made of metal, the resin surface layer of the cord exhibits a great critical PV value (to be described below) relative to the metal rail. The metal rail, therefore, effectively inhibits the abrasion of the cord and the rail to be caused by each other, while permitting satisfactory release of frictional heat.

The metal for the metal rail is preferably excellent in abrasion resistance and durability against contact with the cord and at least 100, more preferably at least 300, in critical PV value [unit: $(kg/cm^2)\cdot(m/min)$]. In other words, it is desirable to select a metal primarily having high abrasion resistance, durability and the greatest possible critical PV value relative to the cord. Examples of such metals are iron, steels (such as stainless steel, carbon steel, nickel-chromium steel and cast steel), nonferrous metals such as chromium, nickel, tin and copper, alloys of such metals (e.g., brass), etc. Among these, nonmagnetic stainless steel is desirable when magnets are employed as the attracting means for effectively preventing derailment of the screw in rotation. To explain the critical PV value, P is the load $(kg/cm^2)$ acting on the cord per $cm^2$ thereof due primarily to gravity on the containers suspended from the screw, and V is the velocity (cm/see) of lateral movement of the cord, the PV value being P multiplied by V $((kg/cm^2)\cdot(cm/sec))$. Generally, the critical PV value $((kg/cm^2)\cdot(cm/sec))$ of plastics relative to metals is about an order of magnitude greater than that of plastics relative to plastics. For example, the value of nylon 6 relative to steel is 590, whereas the value of nylon 6 relative to plastics is 90.

Additionally stated, the rail for use in the container transport apparatus of the present invention is generally an L-shaped rail comprising a body portion and a shelf portion projecting from the body portion at a right angle therewith. The screw is rotated as placed on the shelf portion of the rail and attracted toward the body portion by attracting means (e.g., magnets) embedded in the body portion. The high-speed rotation of the screw produces considerably great sliding friction especially between the contact portions of the shelf and the cord which are subjected to gravity on the screw and containers being transported, and the contact portions are most susceptible to abrasion. Accordingly, the screw can be given a longer life more effectively by forming a circular-arc groove in the contact portion of the shelf for the screw to partly fit in and to bear on the shelf portion over an increased area and thereby diminishing the abrasion of the cord and shelf contact portions.

The apparatus of the present invention for transporting powder and granular materials comprises the flexible screw of the invention inserted through a pipe. The transport apparatus in its entirety is approximately the same with the conventional one already described except that the coiled metal wire is replaced by the screw of the invention. Accordingly, the pipe is made of a metal (e.g., stainless steel) or resin (such as plastics, nylon, polyacetal, ultrahigh-molecular-weight polyethylene or the like) as in the prior art. The screw installed inside the pipe made of such a material is given at its one end a rotational driving force to transport the powder and granular material through the pipe from inlet to outlet. The term "powder and granular materials" as used herein refers to so-called bulk materials such as gravel, broken stones, coals, cokes, iron ores, earth, limestone, grain, cement, chips or pellets of woods and resins, etc.

The flexible screw of the present invention can be installed along straight and curved paths of transport, ensures smooth transport of containers and provides container transport apparatus of simplified construction at reduced costs. Further when used for transporting powder and granular materials, the screw serves to diminish the abrasion of the pipe.

Furthermore, the container transport apparatus of the present invention is adapted to transport containers smoothly even along curved paths, and not only assures the screw of a reduced maintenance cost but also ensures considerably inhibited abrasion of the rail for the operation of the apparatus. With the powder and granular transport apparatus of the invention, the pipe can also be less susceptible to abrasion.

BEST MODE OF CARRYING OUT THE INVENTION

Flexible screw and transport apparatus embodying the present invention will be described below in detail.

Figure 1:
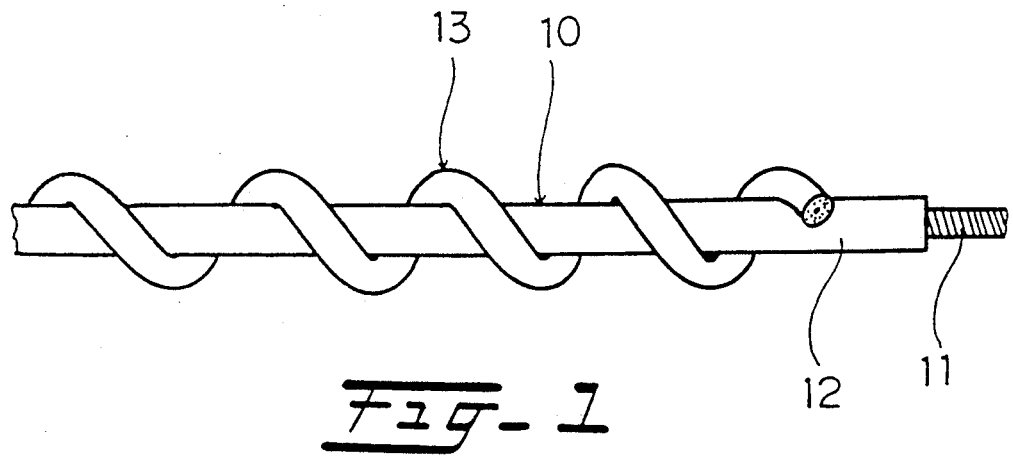
FIG. 1 is a front view partly broken away and showing a basic example of screw embodying the invention.

FIG. 1 shows a screw 10 having a basic construction wherein a flexible rod comprises a metal rope 11, and a coating layer 12 of resin formed on the metal rope. A resin cord 13 is helically wound on the rod with a predetermined pitch. For example, when the screw is for use in apparatus for transporting containers having a neck 26.0 mm in diameter, a flange 41.2 mm in diameter and a wall thickness of 3.35 mm (see FIG. 11 for the shape of containers), the screw measures 9 mm in the diameter of the rod, 3 mm in the diameter of the cord, 15 mm in the flight diameter thereof, and 35 mm in the cord winding pitch.

Figure 2:
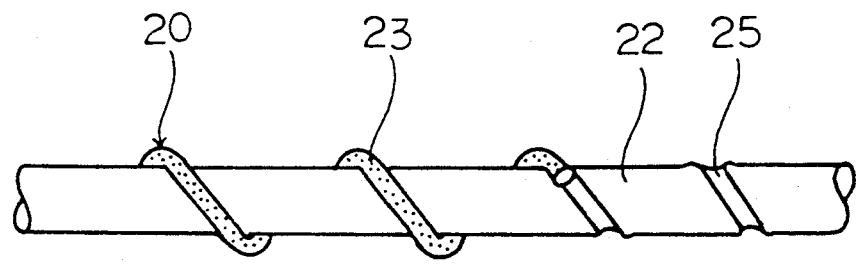
FIG. 2 is a front view partly broken away and showing a screw comprising a rod having a helical continuous groove.

FIG. 2 shows a screw 20 which comprises a rod 22 having a metal rope and a coating resin layer on the rope, and a resin cord 23 wound around the rod and fitted in a helical groove 25 formed in the surface layer of the rod.

Figure 3:
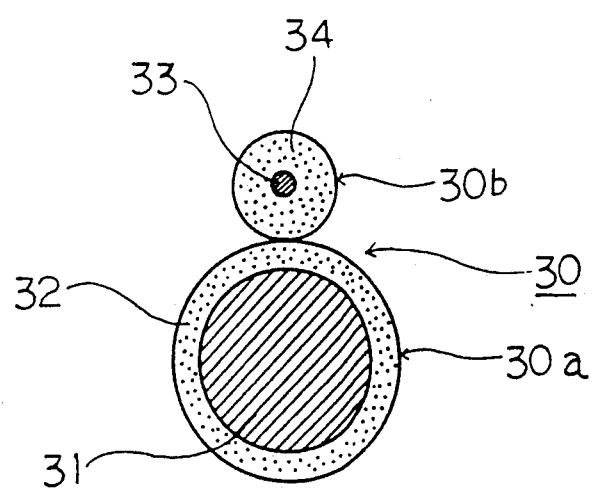
FIG. 3 is a sectional view of a screw comprising a core in the form of a bundle of fibers in a cord.

FIG. 3 shows in section another screw 30 embodying the invention. A flexible rod 30a comprises a metal rope 31, and a coating layer 32 formed on the metal rope. A resin cord 30b helically wound on the rod 30a comprises a resin layer 34, and a core 33 in the form of a bundle of fibers having a specific amount of buckling of up to 3.0% in the center of the resin layer.

Figure 4:
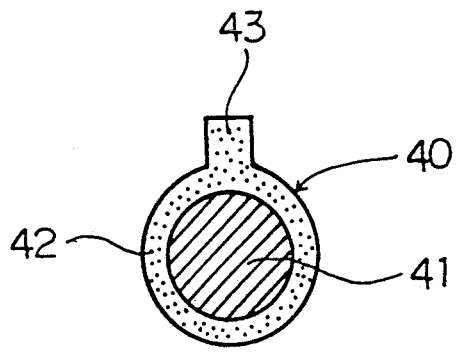
FIG. 4 is a sectional view of a screw comprising a cord and a rod having a resin surface layer molded integrally with the cord.
Figure 5:
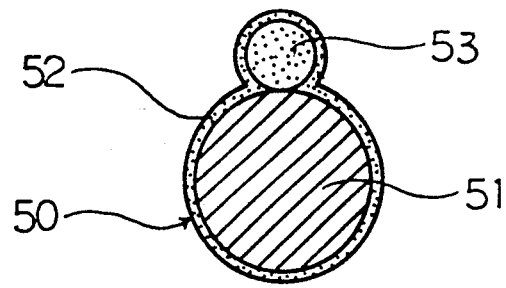
FIG. 5 is a sectional view of a screw comprising a rod and a cord which are covered with a baked layer of coating composition or a heat-shrinkable tube.

FIG. 4 shows a screw comprising an integral molding of cord and rod. More specifically, a coating layer 42 applied on a metal rope 41 and a cord 43 having a rectangular cross section are molded integrally. FIG. 5 shows a screw 50 comprising a metal rope 51, a resin cord 53 wound on the rope, and a baked layer 52 covering the resulting assembly and prepared with a coating polymer composition, or a heat-shrinkable tube enclosing the assembly and shrunk by heating.

Figure 6:
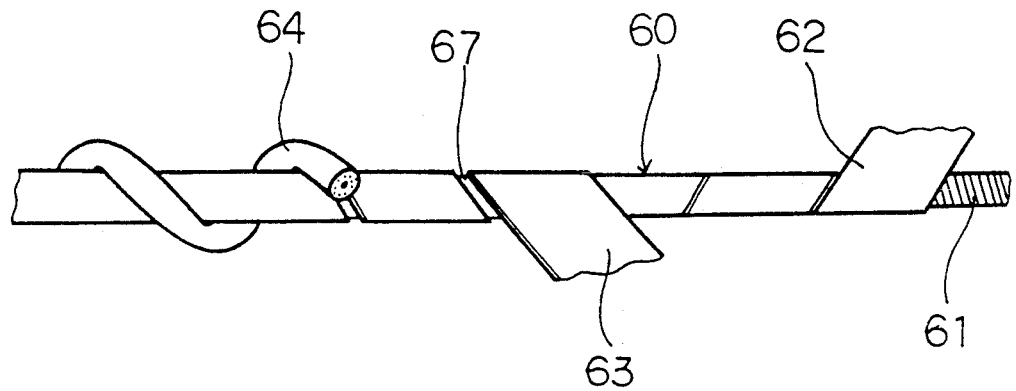
FIG. 6 is a front view partly broken away and showing a screw wherein an abrasion-resistant tape is helically wound on a rod with a gap.
Figure 7:
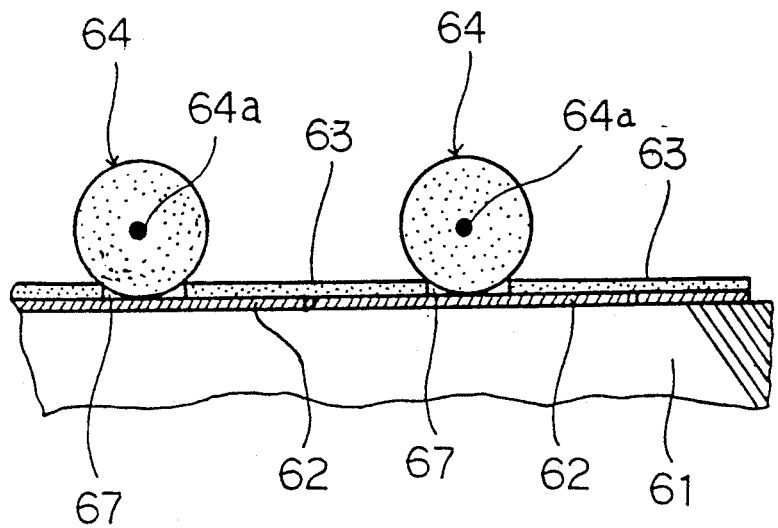
FIG. 7 is a view in longitudinal section and partly broken away to show the screw of FIG. 6.

FIG. 6 shows a screw wherein an abrasion-resistant tape is used, and FIG. 7 shows the same in longitudinal section. The screw 60 comprises a metal rope 61, and a coating layer formed on the metal rope 61 by helically winding a single-faced (or double-faced) adhesive tape 62 on the rope without any gap between the windings to cover the metal rope 61 with the tape 62. An abrasion-resistant resin tape 63 is further helically wound around the tape 62 in a direction opposite to the winding direction of the tape 62, with a helical gap 67 formed between the windings of the tape 63. A resin cord 64 is wound along the gap 67. As will be apparent from FIG. 7, the cord 64 has a core 64a centrally thereof and is fitted in the gap 67 between the windings of the tape 63 in contact with the tape 62 exposed at the gap 67.

Figure 8:
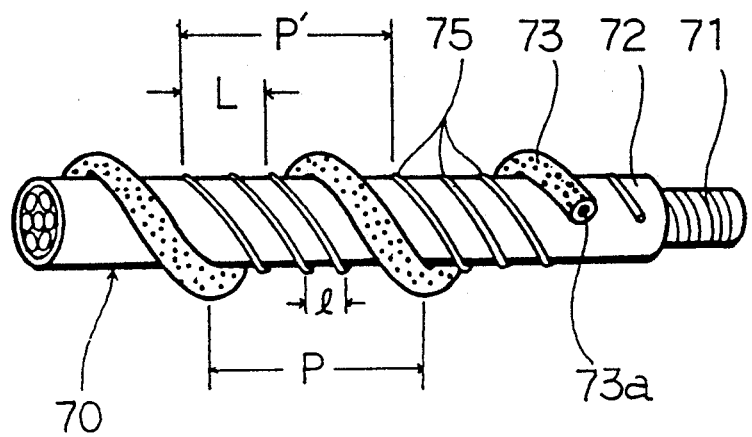
FIG. 8 is a front view partly broken away and showing a screw wherein three metal wires are wound on a rod in the gap formed between helical windings of a cord.

FIG. 8 shows a screw having metal wire windings. The screw 70 comprises a metal rope 71, a coating layer 72 covering the rope, a resin cord 73 having a core 73a and helically wound on the coating layer 72 with a specified pitch, and three metal wires 75 gap-wound at a predetermined distance from one another, around coating layer in the helical gap defined by the windings of the cord 73. The center of windings width L of the metal wires 75, i.e., the metal wire positioned at the midpoint between the two other metal wires, is present in the center of the gap.

Figure 9:
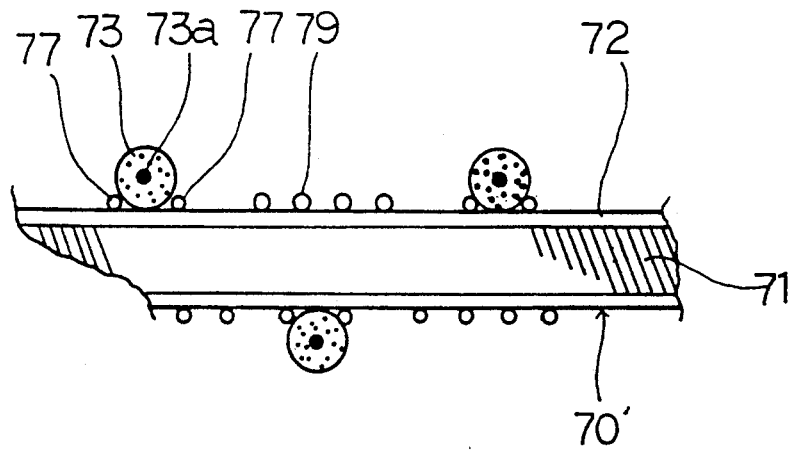
FIG. 9 is a fragmentary view in longitudinal section showing a modification of the screw of FIG. 8 wherein a cord is wound on a rod in a gap between two helically wound metal wires, and four metal wires are further wound on the rod in the gap formed between the windings of the cord.

FIG. 9 is a view in longitudinal section of another embodiment of screw 70' wherein metal wires are used. This embodiment comprises two metal wires 77 helically wound, with a gap formed therebetween, around a coated metal rope, a cord 73 wound on the rope in the gap between the windings of metal wire 77, and four metal wires 79 gap-wound on the rope in the helical gap between the windings of the cord.

Figure 10:
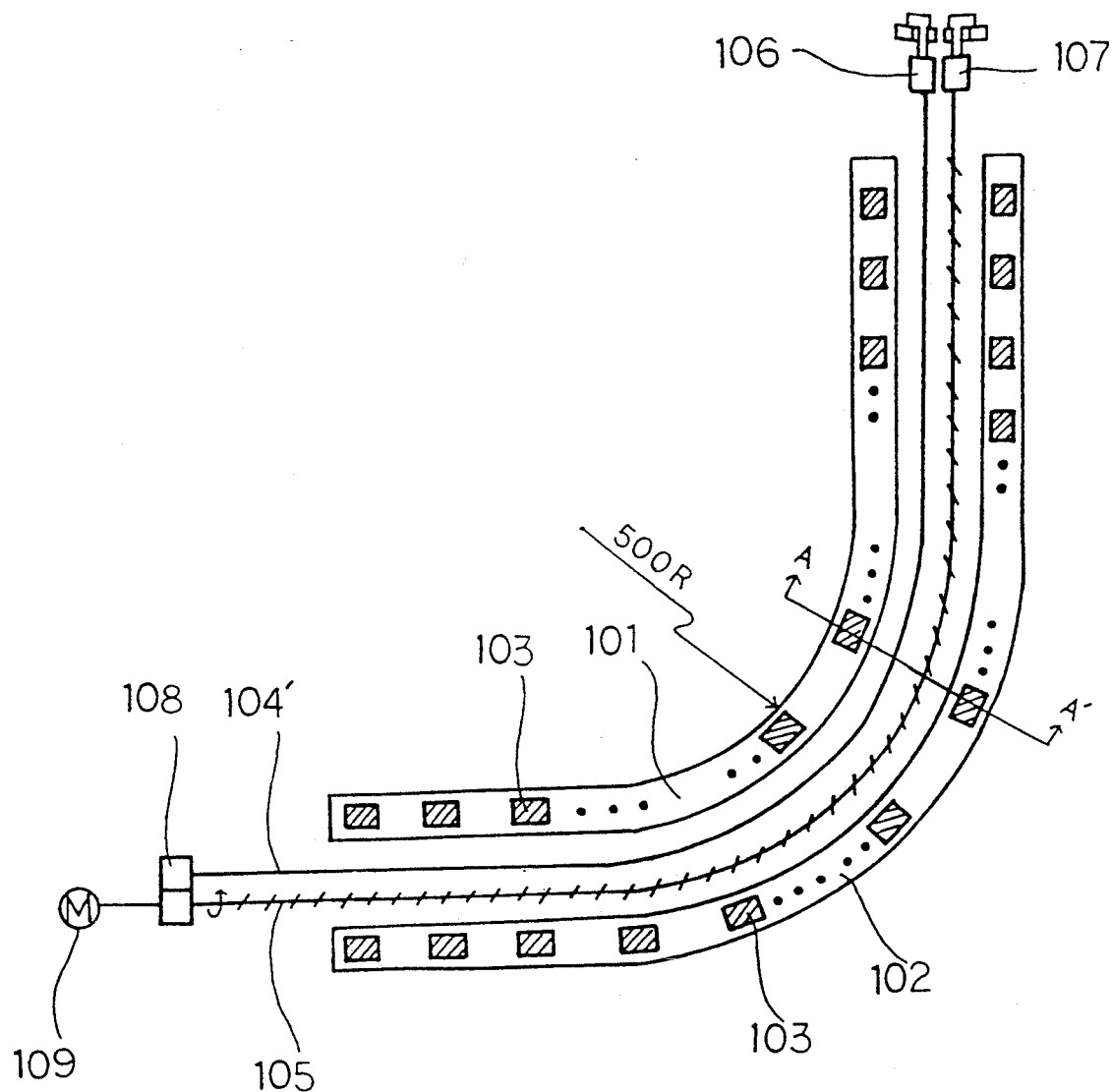
FIG. 10 is a plan view schematically showing a container transport apparatus of the one-side drive type wherein a screw of the invention is used and which includes a system for removing reject containers.

Next, a container transport apparatus will be described generally which has incorporated one of the various flexible screws described above therein. FIG. 10 is a plan view schematically showing the apparatus for illustrative purposes. The apparatus comprises the single screw and a guide which are arranged in parallel and spaced apart from each other by a distance for holding the necks of containers therebetween. The apparatus is of the one-side drive type wherein the screw is rotated to transport containers as held between the screw and the guide in suspension. As already stated, such container transport apparatus are generally of the one-side drive type wherein a guide is opposed to the screw. With reference to FIG. 10, two rails 101, 102 having an overall length of about 3 m are curved approximately through a right angle with a radius of curvature of 500 mm and arranged as opposed to each other. Permanent magnets 103 are embedded at a predetermined spacing (e.g., 200 mm) in the rails 101, 102. Although not illustrated in detail, the screw 105 is held attracted to the rail 102 by the magnets 103 in the rail 102, and the guide 104' is secured to the rail 101. The screw 105 is rotatably supported at its one end by a bearing 107 and at the other end by another bearing 108. The guide 104' is immovably supported at its one end by a bearing 106 and at the other end thereof by the bearing 108. The bearing 108 is coupled to a motor 109, whereby the screw 105 is rotatable in the direction of arrow. The bearing 108 may have a speed change gear for adjusting the rotational speed to be transmitted to the screw 105.

With the apparatus described, the containers (not shown in FIG. 10) held between the guide 104' and the screw 105 in suspension are moved in one direction (toward the bearing 108 in the drawing) by rotating the screw 105 in the direction of arrow.

Figure 11:
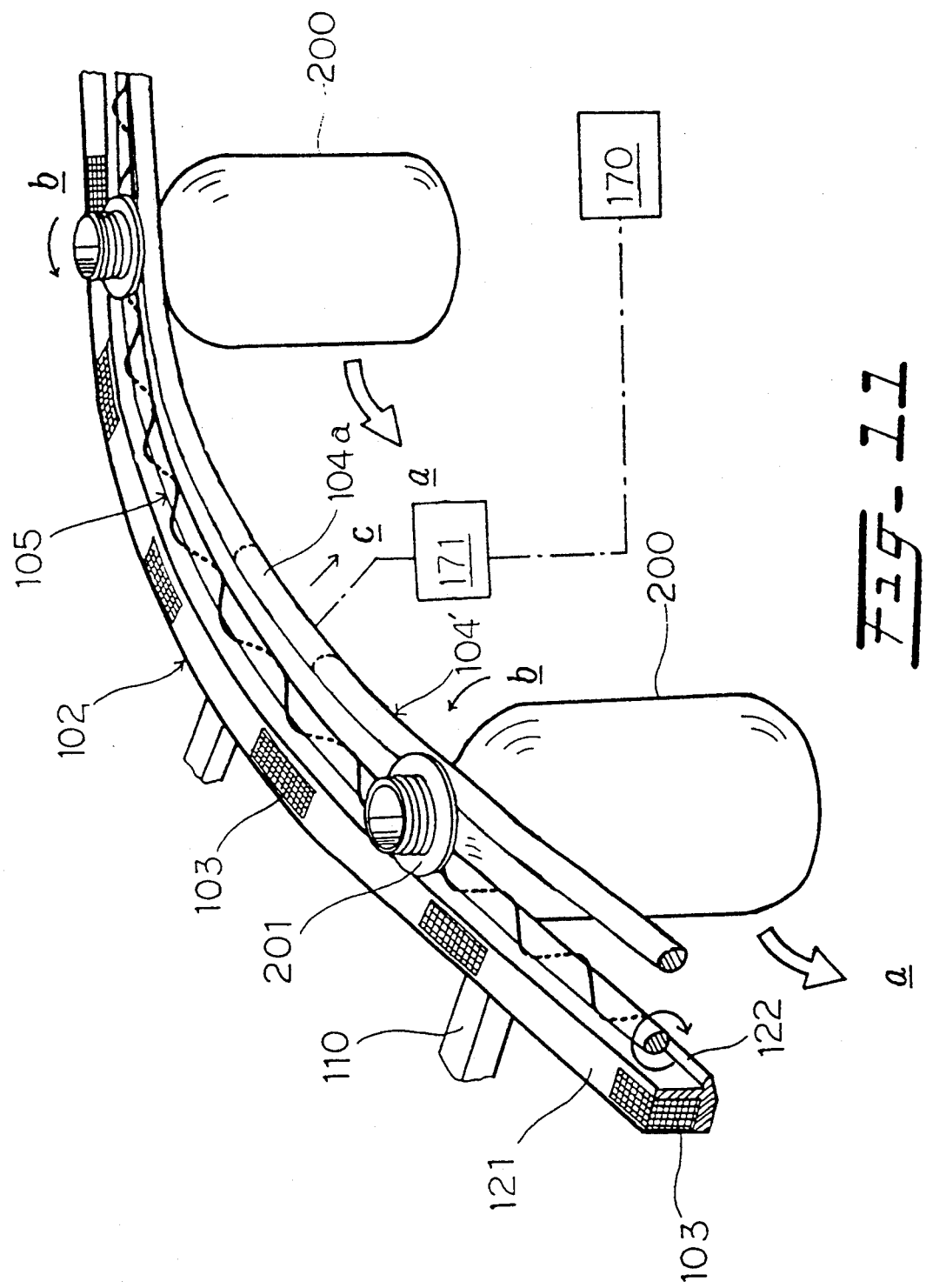
FIG. 11 is a fragmentary perspective view of the apparatus as partly omitted along the line A—A' in FIG. 10.
Figure 12:
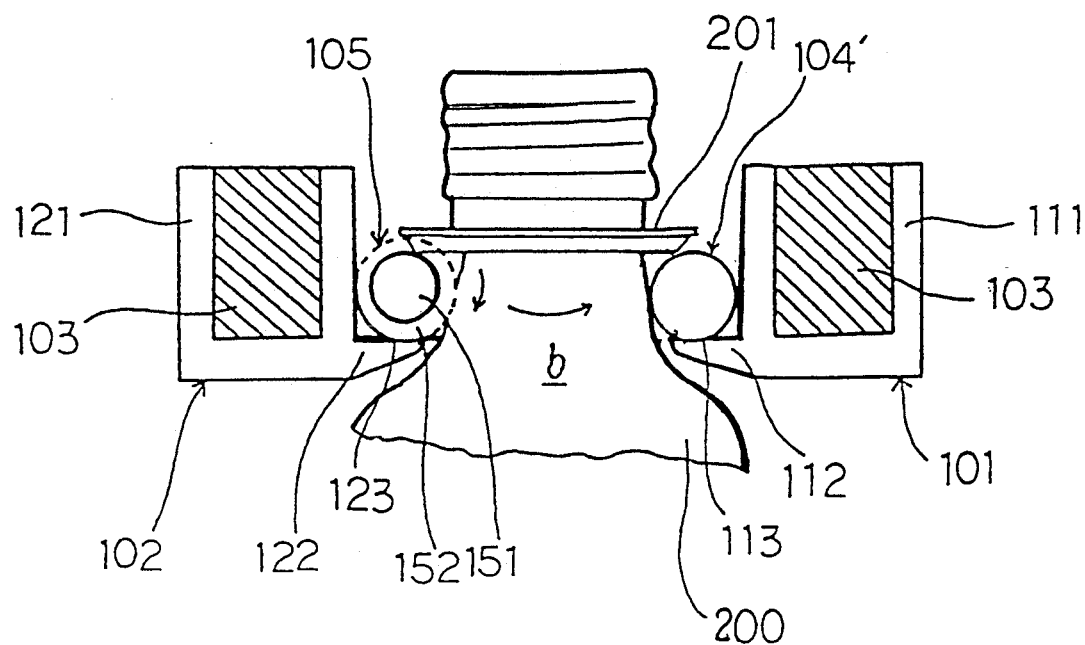
FIG. 12 is a fragmentary view in section taken along the line A—A' in FIG. 10.
Figure 13:
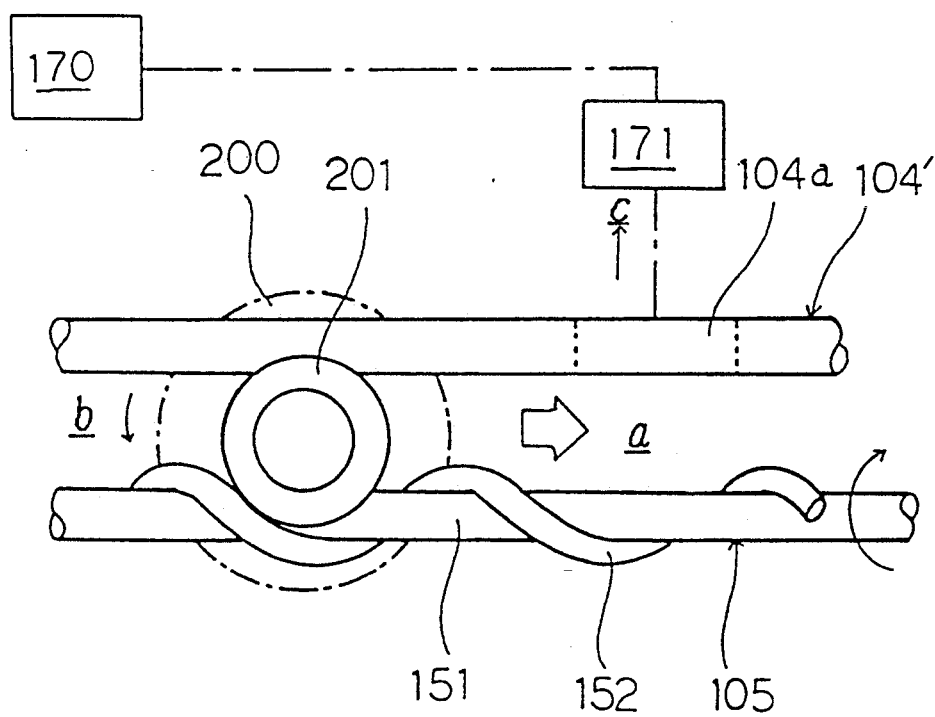
FIG. 13 is a fragmentary plan view for illustrating the principle of transport by the apparatus shown in FIG. 10.

The container transport apparatus will be described in greater details with reference to FIGS. 11 to 13. FIG. 11 is a perspective view of FIG. 10 as partly omitted along the line A—A' therein, FIG. 12 is a view in section taken along the line A—A', and FIG. 13 is a diagram for illustrating the principle of transport by one-side drive. The rail 102 (the rail 101 is not shown in FIG. 11) has a rectangular body portion 121 of stainless steel and a shelf portion 122 projecting from the body portion 121 at a right angle therewith, and is L-shaped in its entirety. Similarly, the rail 101 also has a body portion 111 and a shelf portion 112. Both the rails 101, 102 are supported at a given spacing by support arms 110 (not shown in FIG. 11 for the rail 101) with their shelf portions 112, 122 opposed to each other, and the support arms 110 are fixed to posts (not shown). The permanent magnets 103, which are rectangular, are embedded at the predetermined spacing in the body portions 111, 121. The guide 104' fixedly rests in a circular-arc groove 113 formed in the upper surface of the shelf portion 112. The screw 105 is fitted in a circular-arc groove 123 formed in the upper surface of the shelf portion 122 and is rotatable in sliding contact with the portion 122. The screw 105 is attracted to the side surface of the body portion 121 and held in engagement with the body portion 121 and the shelf portion 122 by the corresponding permanent magnets 103 so as not to be released from the rail 102. Consequently, the guide 104' and the screw 105 are easily removable from and mountable on the respective rails 101, 102 for the replacement of the guide and the screw.

The guide 104' included in the present embodiment is in the form of a round bar of resin and is flexible. The round bar guide 104', which is placed on the rail 101, is merely secured to the rail 101 and is not rotatable. The screw 105 comprises a flexible rod 151, and a resin cord 152 helically wound on the rod with a specified pitch. The screw 105 is rotatable on the rail 102 by the motor 109 (see FIG. 10) in the direction of arrow.

As will be apparent from FIG. 12 showing the apparatus containers 200 made, for example, of polyethylene terephthalate are suspended by the guide 104' and the screw 105 as held therebetween, with a flange 201 on the neck of each container 200 in engagement with the guide 104' and the screw 105. With the rotation of the screw 105, the containers 200 are then transported in the direction of arrow a while rotating in the direction of arrow b each about its own axis. Thus, the containers 200 are advanced one after another by being pushed toward the direction of arrow a by the cord 152 of the screw 105.

With reference to FIGS. 11 and 13, the present apparatus further has a system for removing reject containers while the containers are being transported in suspension. More specifically, a sensor 170 detects a damaged or cracked container, whereupon a drive mechanism 171 functions in response to a signal from the sensor 170, moving a portion of the guide 104', i.e., a shiftable portion 104a, toward the direction of arrow c. With the guide 104' thus locally removed, the reject container falls downward at this location. Upon the removal of the reject container, the shiftable portion 104a is immediately returned to the original position by the drive mechanism 171 so that the following containers can be transported free of trouble. The drive mechanism 171 may comprise a magnetic force generator for attracting the shiftable portion 104a when this portion 104a is made of a magnetic material, or may alternatively be a device for pulling the shiftable portion 104a. The mechanism is not limited insofar as the shiftable portion 104a is thereby movable in response to the detection signal from the sensor 170.

Figure 14:
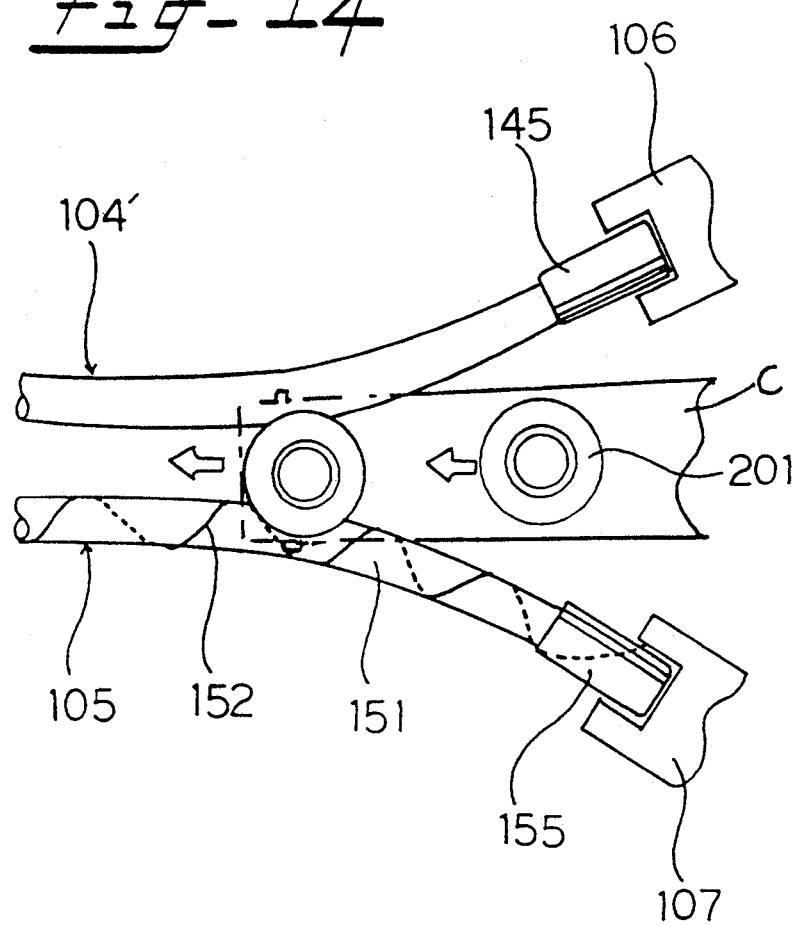
FIG. 14 is a diagram in plan for illustrating how to feed containers to the container transport apparatus at its inlet side.

Containers can be fed to the transport path by spacing the guide 104' and the screw 105 apart by an increased distance at the upstream end of the path as seen in FIG. 14. According to the present embodiment, the guide 104' and the screw 105 are provided, each at one end thereof, with fasteners 145, 155, respectively, which are accommodated in the respective bearings 106, 107. The bearings 106, 107 are disposed away from each other. Each container is transferred to a position where the neck thereof is held between the guide 104' and the screw 105 by the engagement of its flange 201 therewith, by a conveyor C or like feeder means disposed below these members. In this way, the containers are readily feedable merely by bending the guide and the screw and thereby increasing the width of the transport path. This is attributable to the flexibility of the screw (and the guide) of the present invention and can in no way be realized with the use of the conventional rigid screw.

Figure 15:
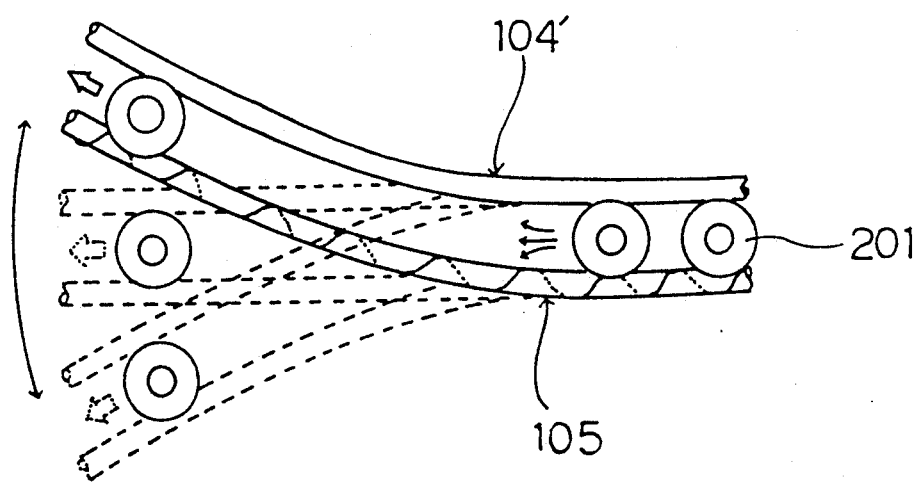
FIG. 15 is a diagram in plan for illustrating how to deliver containers from the container transport apparatus at its outlet side.

The containers can be delivered from the apparatus selectively to the desired one of different positions utilizing the flexibility of the screw of the present invention, for example, by deflecting the other ends of the guide 104' and the screw 105 with the neck of the container held therebetween, by suitable delivery direction changing means (not shown) as shown in FIG. 15.

Figure 16:
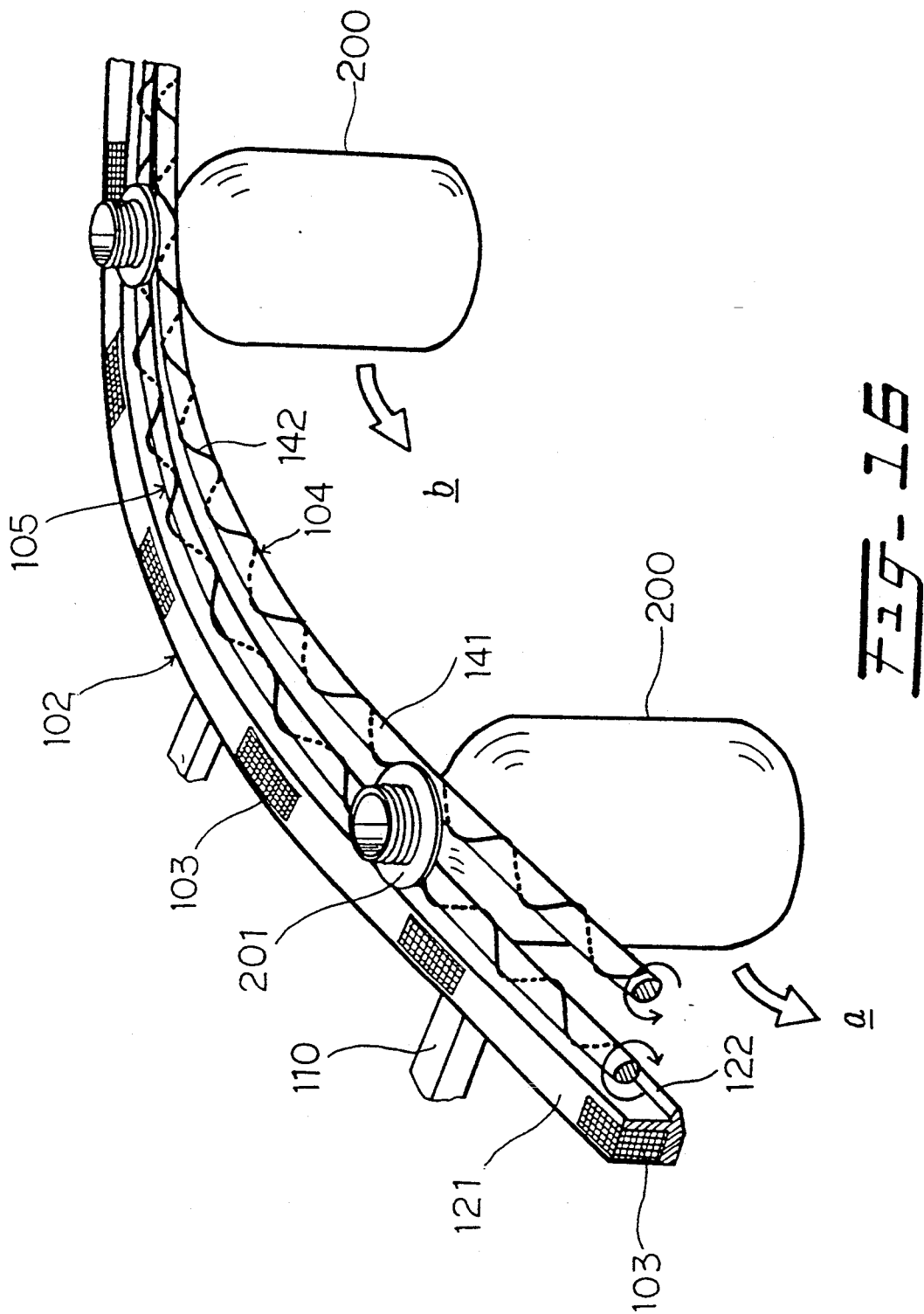
FIG. 16 is a fragmentary perspective view of a container transport apparatus of the two-side drive type wherein two screws are used.

Although the foregoing embodiment is of the one-side drive type wherein one screw is rotated, FIG. 16 shows an apparatus wherein two screws are rotated by two-side drive. In this apparatus adapted for two-side drive, screws 104, 105 are held attracted to rails 101, 102, respectively. The screws 142, 152 comprise flexible rods 141, 151 and resin cords 104, 105, respectively, but are opposite to each other in the cord winding direction. With this apparatus, containers 200 are transported in the direction of arrow a with the rotation of the two screws 104, 105.

Figure 17:
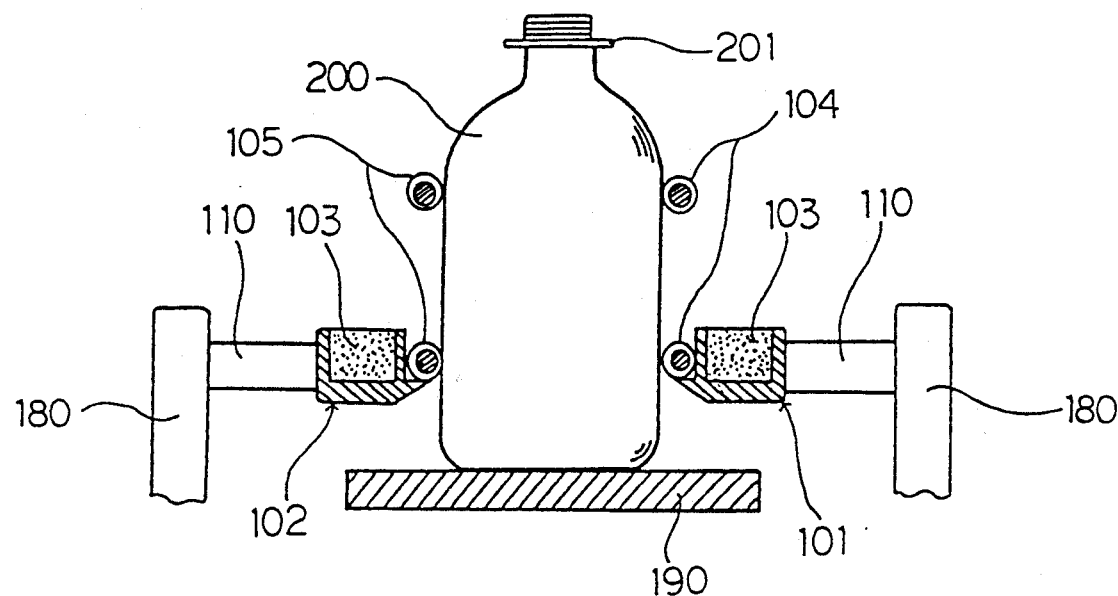
FIG. 17 is a fragmentary view in section showing another mode of transporting containers.

While the above embodiments are adapted to hold the necks of containers, FIG. 17 shows an embodiment adapted to hold the trunks of containers. The container 200 is transported as placed on a conveyor 190 such as a chain conveyor or steel conveyor, and two pairs of screws 104, 105 for preventing the container from tumbling are arranged in opposed relation with each other at a spacing for holding the trunk at its upper and lower portions. The screws 104, 105 are respectively held attracted to rails 101, 102 having permanent magnets 103. Each rail is supported by support arms 110, which in turn are supported by posts 180, although the rails, support arms and posts for the upper screws 104, 105 are not shown in the drawing. In this mode of transporting containers, the transport force for the containers is given by the conveyor 190, while the screws 104, 105 serve to support the trunk of each container at its opposite side. Transport of containers 200 can be expedited by rotating the screws 104, 105.

Figure 18:
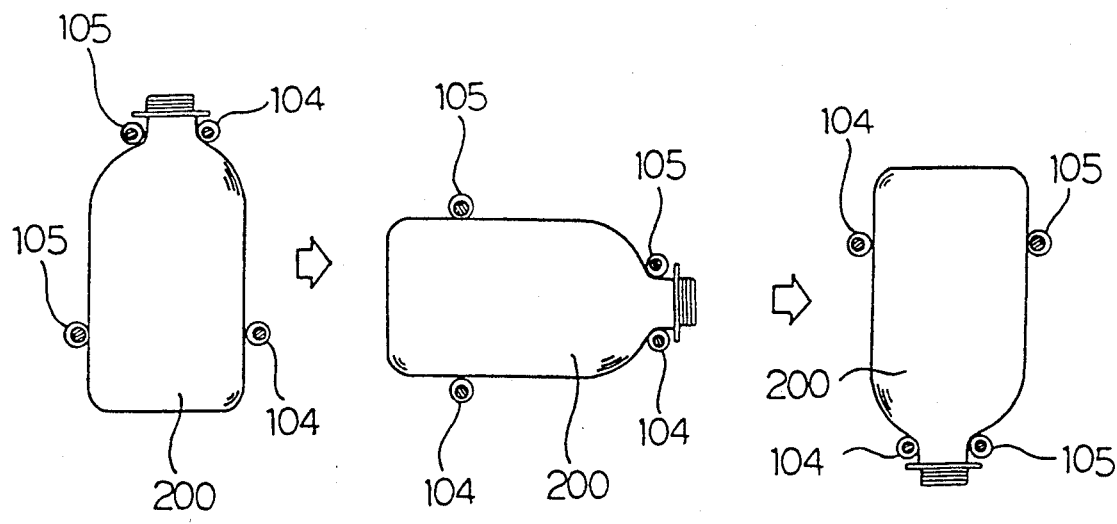
FIG. 18 is a fragmentary view in section showing still another mode of transporting containers.

FIG. 18 shows an arrangement wherein both the neck and the trunk of the container are held at the same time for transport. As will be apparent from the drawing, each of the neck and the trunk of the container 200 is held between a pair of screws 104, 105, and the container 200 is transported while being reliably held by the four screws. In this case, therefore, the container 200 can be rotated or positioned bottom up when a helical path of transport is installed, so that a process, for example, for washing or pasteurizing the interior of the container 200 can be readily incorporated into the transport path.

Figure 19:
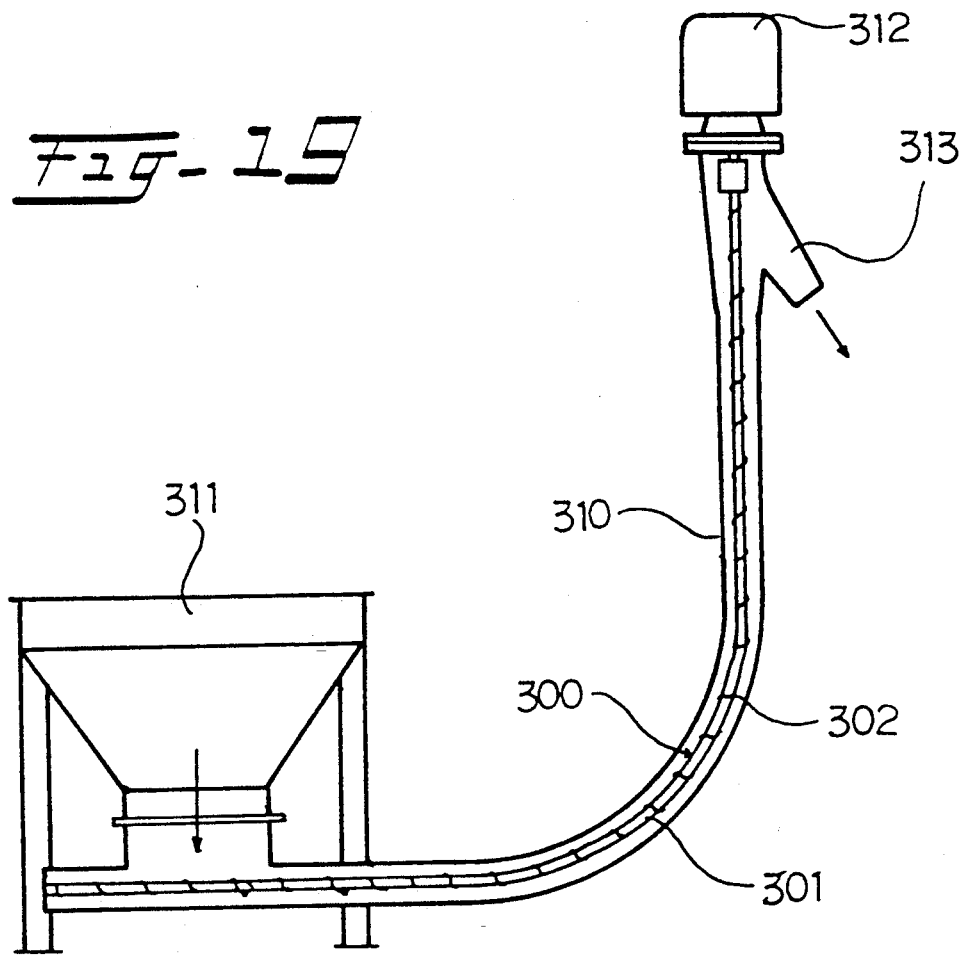
FIG. 19 is a diagram of a powder and granular material transport apparatus comprising a screw of the present invention.
Figure 20:
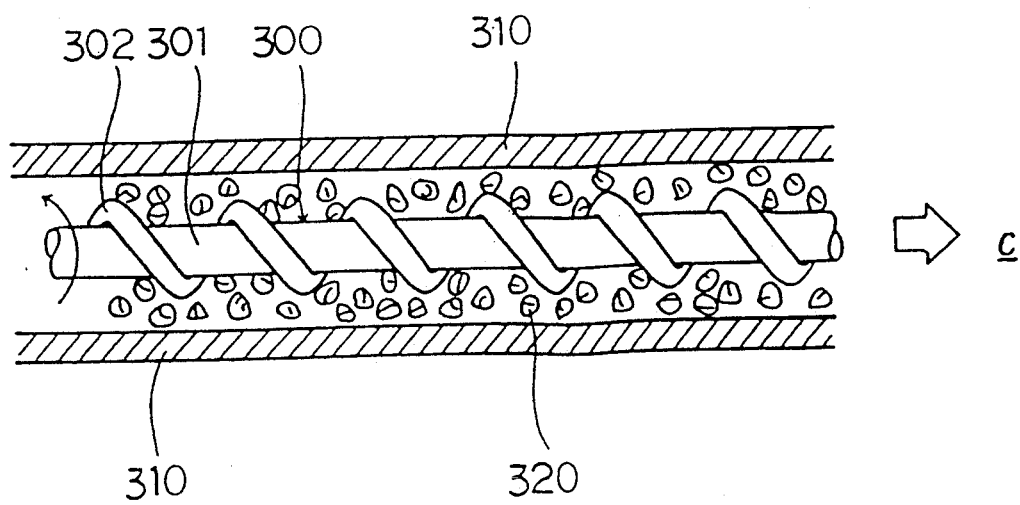
FIG. 20 is a fragmentary view in longitudinal section for illustrating the principle of transport by the apparatus shown in FIG. 19.

Next, a powder and granular material transport apparatus will be described. FIG. 19 shows an embodiment for transporting a powder and granular material upward. The embodiment comprises a flexible pipe 310 providing a curved path of transport, and a flexible screw 300 having a flexible rod 301 and a resin cord 302 and extending through the pipe coaxially therewith. The screw 300 has one end connected directly to a motor 312 and the other end rotatably supported by a bearing (not shown). With this apparatus, the powder and granular material supplied from a hopper 311 is transported upward and discharged from an outlet 313 adjacent to the motor by rotating the motor 312. FIG. 20 shows the assembly of screw and pipe during the transport of the powder and granular material 320. The material 320 present in the interior space of the pipe 310 around the screw 300 is pushed forward chiefly by the cord 302 owing to the rotation of the screw 300 in the direction of arrow and is continuously transported in the direction of arrow c.

What is claimed is:

1. A flexible screw comprising:
   a flexible rod comprised of a metal rope and a resin layer coated on said metal rope; and
   a cord-shaped element helically mounted on said flexible rod and being of resin and having a core of a bundle of fibers for making said cord-shaped element substantially inextensible.

2. A screw according to claim 1, wherein the resin material of the resin layer applied on the metal rope has a wear rate of not more than $5 \times 10^{-4}$ mm$^3$/kg·m.

3. A screw according to claim 1, wherein the resin material of the resin layer applied on the metal rope has a coefficient of dynamic friction of not more than 1.0.

4. A screw according to claim 1, wherein the resin material of the cord has a specific wear rate of not more than $5 \times 10^{-4}$ mm$^3$/kg·m.

5. A screw according to claim 1, wherein the resin material of the cord has a coefficient of dynamic friction of not more than 0.4.

6. A transport apparatus comprising a rotatable screw having a flexible rod and a cord-shaped element helically set on said rod, and a guide, said screw and said guide extending in parallel along the entire length of said screw and at a specified distance from each other to define a transport path therebetween having a width for holding a container to be transported between and in contact with the screw and the guide for transporting said container along the transport path by rotating the screw.

7. A transport apparatus according to claim 6, comprising a sensor for detecting reject containers and a reject containers-removing system which removes reject containers from the transport path in response to the sensor.

8. A transport apparatus according to claim 6, wherein at an input end, the transport path is increased in width and equipped with a feeder means for transferring containers to a position where the containers are to be held by the path.

9. A transport apparatus according to claim 6, comprising a delivery direction changing means for changing the delivery direction of containers while retaining a given width of a transport path at the delivery end.

10. A transport apparatus according to claim 6, wherein the specified distance is a space width enough for holding the neck of containers.

11. A transport apparatus comprising:
    a screw having a flexible rod and a cord helically set on said rod;
    a guide, said screw and said guide extending in parallel at a specified distance from each other to define a transport path therebetween, whereby containers held between the screw and the guide are transported along the transport path by rotating the screw; and
    a rail having means for attracting the screw toward said rail.

12. A transport apparatus according to claim 11, comprising an attracting means set in the rail for attracting the screw to prevent derailment.

13. A transport apparatus according to claim 11, wherein the rail is made of a metal.

14. A transport apparatus according to claim 11, wherein a circular-arc groove is formed in the shelf on a rail for attracting the screw to accommodate part of the screw.

15. A transport apparatus as claimed in claim 11 further comprising a sensor for detecting reject containers and a reject containers-removing system which removed reject containers from the transport path in response to the sensor.

16. A transport apparatus as claimed in claim 11 wherein on the feeding end the transport path has an increased width and has a feeder means for transferring containers to a position where the containers are held in said transport the path.

17. A transport apparatus as claimed in claim 11 further comprising a delivery direction changing means for changing the delivery direction of containers while retaining a predetermined width of said transport path at the delivery end.

* * * * *